United States Patent [19]
Harris

[11] Patent Number: 5,937,108
[45] Date of Patent: Aug. 10, 1999

[54] METHOD OF GENERATING A SCALED REPLICA OF A DIGITAL INPUT IMAGE BY PARTITIONING THE INPUT INTO SEVERAL SYMMETRICAL DISTORTED SECTIONS

[75] Inventor: Craig Weaver Harris, Lake Forest, Calif.

[73] Assignee: Unisys Corporation, Blue Bell, Pa.

[21] Appl. No.: 09/008,217

[22] Filed: Jan. 16, 1998

[51] Int. Cl.[6] .................................................. G06K 9/32
[52] U.S. Cl. ........................................ 382/298; 382/294
[58] Field of Search .................................... 382/298, 294, 382/299, 277, 152, 286; 345/439, 435

[56] References Cited

U.S. PATENT DOCUMENTS

| | | | |
|---|---|---|---|
| 5,107,254 | 4/1992 | Choi ......................................... | 382/298 |
| 5,539,534 | 7/1996 | Hino et al. ............................... | 382/298 |
| 5,701,138 | 12/1997 | Othmer et al. .......................... | 382/298 |
| 5,872,874 | 2/1999 | Natarajan ................................ | 382/298 |

*Primary Examiner*—Yon J. Couso
*Attorney, Agent, or Firm*—Charles J. Fassbender; Mark T. Starr; Steven R. Petersen

[57] ABSTRACT

An input image is comprised of an array of pixels in rows and columns. To generate a scaled replica of the input image, that input image is first partitioned into several identical sections, in which each section has $P_R$ pixels per row and $P_C$ pixels per column. Then the number of pixels-per-row $P_R'$ and the number of pixels-per-column $P_C'$ that are to be in each corresponding section of the scaled replica is selected, where $P_R'$ and $P_C'$ are any positive integers which can be larger or smaller than $P_R$ and $P_C$. Then just a single section of the input image is distorted such that the spacing between columns is $(P_R'-1)x$ and the spacing between rows is $(P_C'-1)y$, where x and y are arbitrary units of distance, such as one inch or one meter. Then the single distorted section of the input image is overlaid with a section of a new row-column array, where the spacing between columns is $(P_R-1)x$ and the spacing between rows is $(P_C-1)y$, and where x and y are the same units of distance that are in the distorted input image. Then, using the above described spacings between the rows and the columns in the single distorted section of the input image and the overlaid new array, the pixels for all sections of the scaled replica are generated as a function of the various areas which those rows and columns delineate.

11 Claims, 11 Drawing Sheets

EQ. 1 → $I(3,2) = P(2,2)\left(\frac{A3}{A}\right) + P(3,2)\left(\frac{A4}{A}\right) + P(3,1)\left(\frac{A1}{A}\right) + P(2,1)\left(\frac{A2}{A}\right)$ EQ. 2 → $\left(\frac{A3}{A}\right) = \frac{(382x - 212x)(795y - 717y)}{(212x)(265y)} = \frac{(78)(170)}{(212)(265)}$ EQ. 3 → $I(R',C') = P(UR)\left(\frac{A3}{A}\right) + P(LR)\left(\frac{A4}{A}\right) + P(LL)\left(\frac{A1}{A}\right) + P(UL)\left(\frac{A2}{A}\right)$

METHOD OF GENERATING A SCALED REPLICA OF A DIGITAL INPUT IMAGE BY PARTITIONING THE INPUT INTO SEVERAL SYMMETRICAL DISTORTED SECTIONS

BACKGROUND OF THE INVENTION

This invention relates to the field of digital imaging; and more particularly, it relates to methods for generating a scaled replica of a digital input image. Such a scaled replica may be a magnified replica or a demagnified replica of the input image.

A particular use f or the present method occurs in electronic recognition systems. With one type of electronic recognition system, a person can either be granted access or denied access to a secure area based on whether or not an image of the person's face is electronically recognized by the system. Also, with another type of electronic recognition system, various components for a product can be selected or rejected by a robotic arm based on whether or not an image of the component is recognized by the system.

In all of the above applications, a key task which needs to be performed as part of the recognition process is that two images must be correlated. One of these images is the image of an unknown object which the system is trying to recognize, and the other image is of a known object which the system uses as a reference. If the correlation between the two images exceeds a predetermined threshold value, then the unknown object is recognized.

However, before the two images can be correlated, they must be scaled such that they have substantially the same magnification. Otherwise, if one image is larger than the other image, a pixel-by-pixel correlation of the two images will never exceed the threshold value.

Accordingly, a primary object of the present invention is to provide a novel method by which a scaled replica of a digital input image can be generated.

BRIEF SUMMARY OF THE INVENTION

The input image which the present invention scales can be any image that is comprised of an array of pixels in rows and columns. To generate the scaled replica of that input image in accordance with the present invention, the following steps are performed.

First the input image is partitioned into several identical sections in which each section has $P_R$ pixels per row and $P_C$ pixels per column, where $P_R$ and $P_C$ are positive integers. Then the number of pixels-per-row $P_R'$ and the number of pixels-per-column $P_C'$ that are to be in each corresponding section of the scaled replica is selected. Here $P_R'$ and $P_C'$ are any positive integers; and they can be larger or smaller than $P_R$ and $P_C$. Then just a single section of the input image is distorted such that the spacing between columns is $(P_R'-1)x$ and the spacing between rows is $(P_C'-1)y$, where x and y are arbitrary units of distance, such as one inch or one meter. Then the single distorted section of the input image is overlaid with a new row-column array, where the spacing between columns is $(P_R-1)x$ and the spacing between rows is $(P_C-1)y$, and where x and y are the same units of distance as used in the distorted input image.

Due to the above described spacings between the rows and the columns in just the single distorted section of the input image and the overlaid new array, the pixels for the entire scaled replica can be generated in accordance with the present invention as a function of the various areas which those rows and columns delineate. A detailed example of how these areas of a single distorted section are used to generate the pixels for the entire scaled replica is shown in FIGS. 5 through 10.

DETAILED DESCRIPTION

Figure 1:
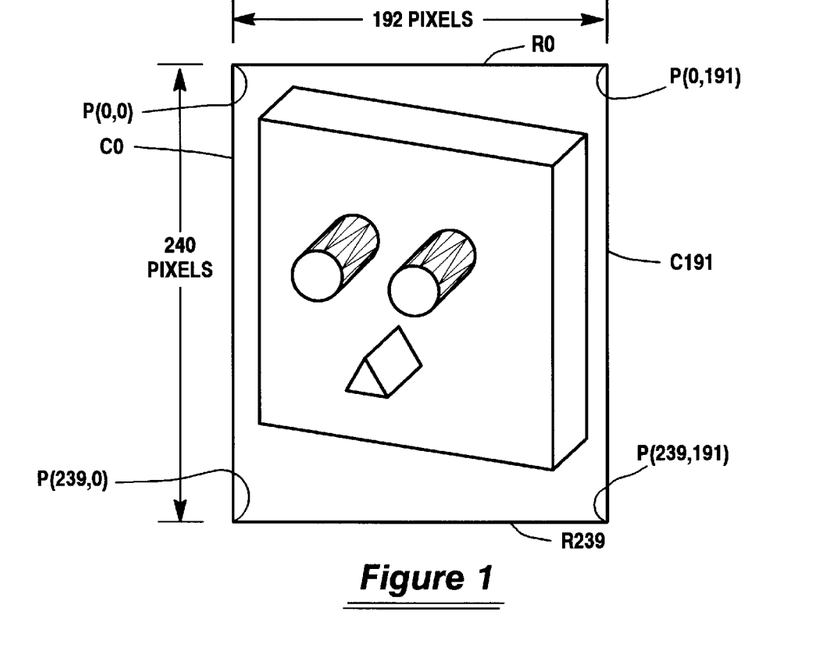
FIG. 1 shows an example of a digital input image from which a scaled replica can be generated in accordance with the present invention.

Referring now to FIG. 1, it shows a digital input image which is to be operated on in accordance with the present invention. This input image consists of an array of pixels in rows and columns which have 192 pixels per row and 240 pixels per column. All of the rows are equally spaced and are numbered consecutively from the top of the input image to the bottom; and all of the columns are equally spaced and are numbered consecutively from the left side of the input image to the right side.

In FIG. 1, the first row on the top of the input image is labeled R0; and the last row on the bottom of the input image is labeled R239. Similarly in FIG. 1, the first column on the left side of the input image is labeled C0; and the last column on the right side of the input image is labeled C191.

At the intersection of each row with each column, a respective pixel P( ) occurs. For example, pixel P(0,0) is at the intersection of row R0 with column C0; and pixel P(239,191) is at the intersection of row R239 with column C191. Each pixel in the input image specifies an infrared light intensity, or a visible light intensity at the point where the pixel occurs.

Figure 2:
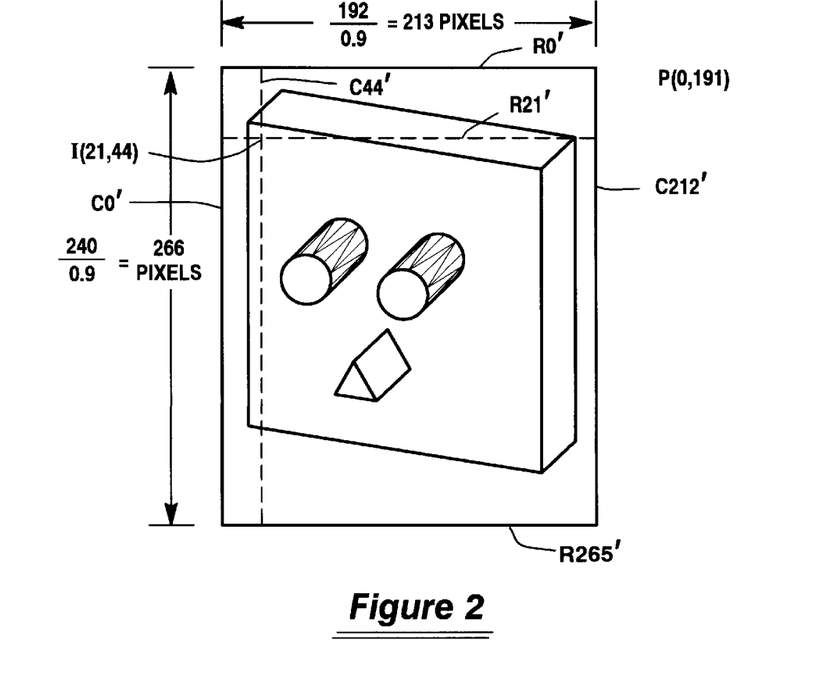
FIG. 2 shows one particular scaled replica of the FIG. 1 input image.

Using the present invention, a scaled replica of the FIG. 1 input image can be generated; and, one particular example of such a replica is shown in FIG. 2. For this FIG. 2 replica, the scale factor is 0.9 which means that the FIG. 1 input image has 0.9 times the magnification of the FIG. 2 replica. In the FIG. 2 replica, the number of pixels per row is 192÷0.9 or 213; and the number of pixels per column is 240÷0.9 or 266. These rows and columns of pixels in the FIG. 2 replica have the same spacing as the rows and columns of pixels in the FIG. 1 input image.

In the FIG. 2 replica, the rows of pixels are consecutively numbered from the top of the replica to the bottom. Thus, the first row on the top of FIG. 2 is labeled R0'; and the last row on the bottom of FIG. 2 is labeled R265'. Similarly, in FIG. 2, the columns of pixels are consecutively numbered from the left side to the right side. Thus in FIG. 2, the first column on the left side is labeled C0'; and the last column on the right side is labeled C212'.

At the intersection of each row with each column in the FIG. 2 replica, an interpolated pixel I( ) occurs. For example, an interpolated pixel I(21,44) lies at the intersection of row R21' with column C44'. These interpolated pixels I( ) are generated from the input image pixels P( ), in accordance with the present invention, as is shown in FIGS. 3–6.

Figure 3:
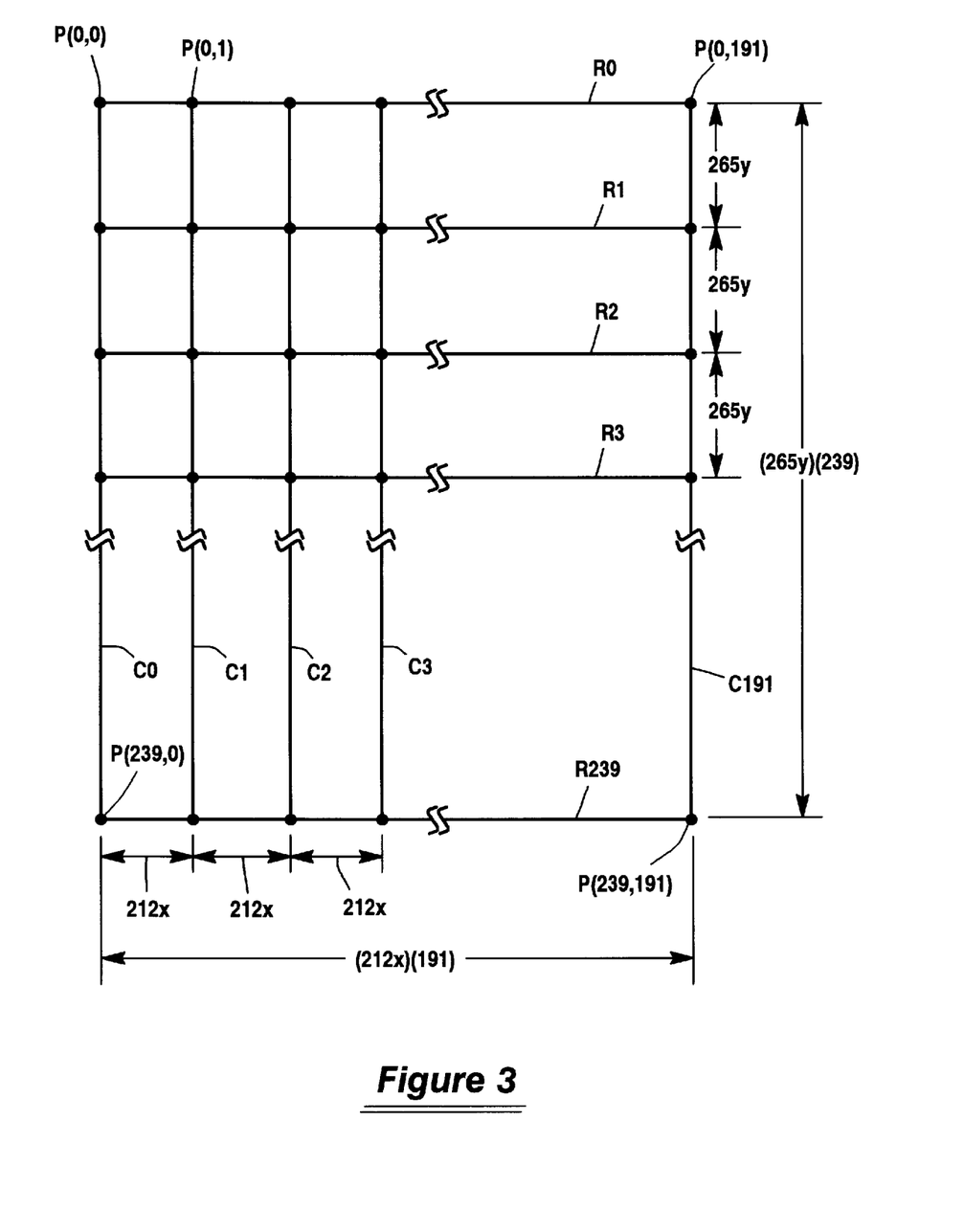
FIG. 3 illustrates an initial step for generating the FIG. 2 replica via the present invention wherein the input image of FIG. 1 is distorted.

As a first step, a distorted input image is formed as shown in FIG. 3. In this distorted input image the spacing between columns is $(P_R'-1)x$, and the spacing between rows is $(P_C'-1)y$. Here, $P_R'$ is the number of pixels that are to be in each row of the scaled replica; $P_C'$ is the number of pixels that are to be in each column of the scaled replica; and x and y are arbitrary units of distance.

In the FIG. 2 scaled replica, the number of pixels per row $P_R'$ is 213. Thus, in the distorted input image of FIG. 3, the spacing between columns is 212x. Similarly, in the FIG. 2 scaled replica, the number of pixels per column $P_C'$ is 266; and thus in the distorted input image of FIG. 3, the spacing between columns is 265y.

Each row in the distorted input image of FIG. 3 contains the same pixels as the corresponding row in the input image of FIG. 1, and thus the rows in FIGS. 1 and 3 are labeled the same. Similarly, each column in the distorted input image of FIG. 3 contains the same pixels as the corresponding column in input image of FIG. 1, and thus the columns in FIGS. 1 and 3 are labeled the same.

Next, the distorted input image of FIG. 3 is overlaid with a new row-column array. This step is shown in FIG. 4 wherein the distorted input image of FIG. 3 is duplicated with solid lines; and the overlaid new array is shown with dashed lines.

In the overlaid new array, a respective row R0', R1' . . . R265' is provided for each row of pixels in the FIG. 2 scaled replica. Similarly, a respective column C0', C1' . . . C212' is provided for each column of pixels in the overlaid new array.

Figure 4:
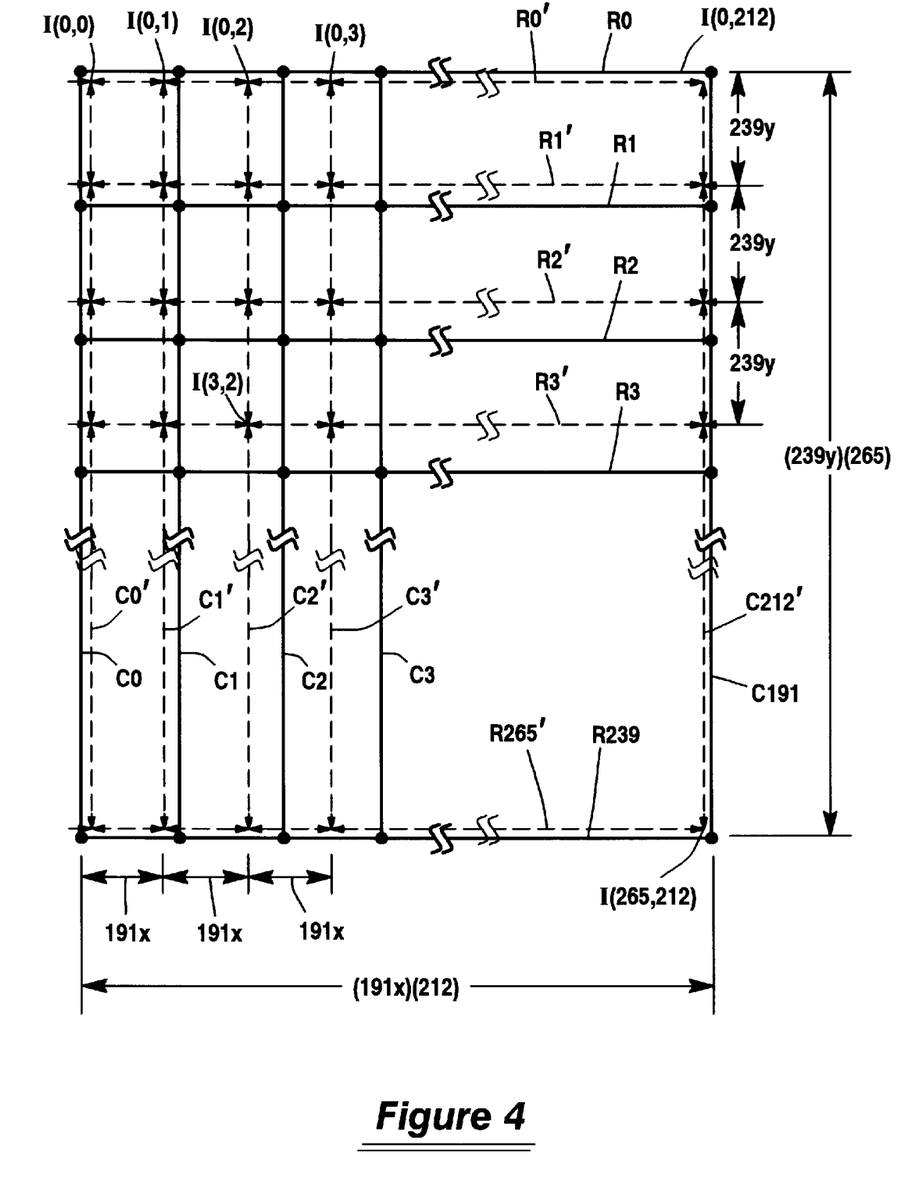
FIG. 4 illustrates another step for generating the FIG. 2 replica via the present invention wherein the distorted input image of FIG. 3 is overlaid with a new array as shown by dashed lines.

Also in the overlaid new array of FIG. 4, the spacing between columns is $(P_R-1)x$ and spacing between rows is $(P_C-1)y$. Here $P_R$ is the number of pixels per row in the input image, and $P_C$ is the number of pixels per column in the input image.

For the input image of FIG. 1, the number of pixels per row $P_R$ is 192, and the number of pixels per column $P_C$ is 240. Thus, the spacing between columns in the overlaid new array of FIG. 4 is 191x, and the spacing between rows in the overlaid new array of FIG. 4 is 239y.

Due to the above described spacings, the rows and the columns in the distorted input image will be separated from the rows and columns in the overlaid new array by many different distances. This can be seen in FIG. 4 wherein row R1' is separated from row R1 by one distance; row R2' is separated from row R2 by another distance; etc. Similarly, column C1' is separated from column C1 by one distance; column C2' is separated from column C2 by another distance, etc. Despite these varying distances, the last row of the two arrays in FIG. 4 will always coincide, and the last columns will always coincide.

Also due to the above described spacings between the rows and the columns in the distorted input image and the overlaid new array of FIG. 4, the pixels for the scaled replica of FIG. 2 can be generated as a function of the various areas which those rows and columns delineate. A detailed example of how these areas are used to generate a pixel for the scaled replica is shown in FIG. 5.

Figure 5:
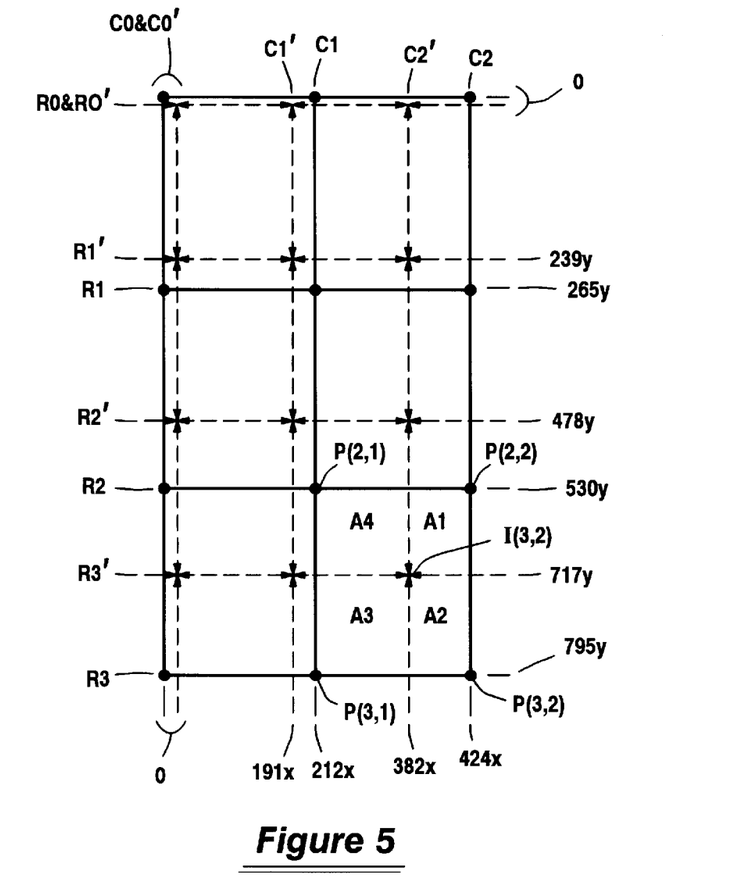
FIG. 5 shows four areas A1 through A4 which are delineated by the rows and columns of the distorted input image and the overlaid new array in FIG. 4.

In the FIG. 5 example, one particular pixel I(3,2) is generated. This pixel I(3,2) lies at the intersection of row R3' with column C2'; and it is formed by interpolating four other pixels in the distorted input image that are closest to the intersection of row R3' with column C2' in the overlaid new array. Those four closest pixels are the pixels P(2,1), P(2,2), P(3,2) and P(3,1) as is shown in FIG. 5.

Figure 6:
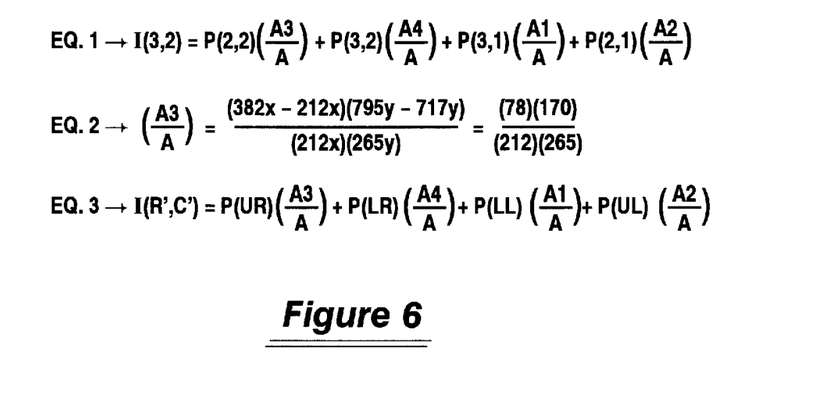
FIG. 6 shows three equations which use the areas A1 through A4 in FIG. 5 to generate a pixel for the FIG. 2 replica.

To interpolate the above four pixels, Equation 1 of FIG. 6 is used. In Equation 1, the terms A1, A2, A3, and A4 are respective areas which are shown in FIG. 5; and the term A is the sum of those areas.

Area A1 is bordered by row R2, column C2, row R3', and column C2'. Thus area A1 has a length which is the distance between rows R3' and R2; and that distance is 717y–530y or 187y. Similarly, area A1 has a width which equals the distance between the columns C2 and C2'; and that distance is 424x–382x or 42x. Thus area A1 equals (187y) (42x). Each of the other areas A2, A3, A4 and A are determined in a similar manner.

In Equation 1, each of the areas A1, A2, A3, and A4 forms a ratio with the total area A. As one example, the ratio of A3 to A is determined in FIG. 6 by Equation 2. From this example it is seen that in the ratio, the arbitrary distance terms x and y cancel out. Thus each of the area ratios which occur in Equation 1 can be expressed simply in terms of integers.

In Equation 1, the area ratios A1÷A and A2÷A and A3÷A and A4÷A are respectively multiplied by the input image pixels P(3,1) and P(2,1) and P(2,2) and P(3,2). Thus as an area ratio increases, the input image pixel which is multiplied by that area ratio has an increased effect on the interpolated pixel I(3,2). For example, area A3 in FIG. 5 is relatively large in comparison to area A1, and thus the interpolated pixel I(3,2) is determined more by the input image pixel P(2,2) and less by the input image pixel P(3,1).

Also in FIG. 6, an Equation 3 is provided which is a generalized expression of Equation 1. By use of Equation 3, all of the pixels which occur in the scaled replica of FIG. 2 can be generated. Each term in Equation 3 is defined below.

I(R',C')—This is a pixel which occurs in the scaled replica, and in the overlaid new array, at the intersection of a particular row R' with a particular column C'.

P(UR)—This is the closest pixel in the distorted input image which lies to the upper right of the intersection between row R' and column C' in the overlaid new array.

P(LR)—This is the closest pixel in the distorted input image which lies to the lower right of the intersection between row R' and column C' in the overlaid new array.

P(LL)—This is the closest pixel in the distorted input image which lies to the lower left of the intersection between row R' and column C' in the overlaid new array.

P(UL)—This is the closest pixel in the distorted input image which lies to the upper left of the intersection between row R' and column C' in the overlaid new array.

A1—This is the area that is bordered by row R' and column C' in the overlaid new array, and by the row and column which intersects at pixel P(UR) in the distorted input image.

A2—This is the area that is bordered by row R' and column C' in the overlaid new array, and by the row and column which intersects at pixel P(LR) in the distorted input image.

A3—This is the area that is bordered by row R' and column C' in the overlaid new array, and by the row and column which intersects at pixel P(LL) in the distorted input image.

A4—This is the area that is bordered by row R' and column C' in the overlaid new array, and by the row and column which intersects at pixel P(UL) in the distorted input image.

A—This is the sum of the areas A1, A2, A3, and A4.

To generate a pixel which lies internally within the scaled replica, all four of the product terms which occur in Equation 3 are evaluated; and each product term includes an area ratio which is evaluated just like the example in Equation 2. By comparison, to generate a pixel which lies on the border of the scaled replica, only two of the product terms in equation 3 need to be determined.

Specifically, to generate a pixel in the left most column of the scaled replica, the only terms in equation 3 which must be evaluated are those which include the pixels P(UL) and P(LL). Similarly, to generate a pixel which occurs in the right-most column of the scaled replica, the only terms in equation 3 which must be evaluated are those which include the pixels P(UR) and P(LR). Likewise, to generate a pixel which occurs in the top column of the scaled replica, the only terms in equation 3 which must be evaluated are those which include the pixels P(UR) and P(UL). And, to generate a pixel which occurs in the bottom row of the scaled replica, the only terms in equation 3 which must be evaluated are those which include pixels P(LR) and P(LL).

Preferably, all of the steps which have been described above in conjunction with FIGS. 1–6 are performed by a digital computer. Any general purpose programmable digital computer can be used, such as an Intel Pentium™ computer.

One preferred method of generating a scaled replica of a digital input image, in accordance with the present invention, has now been described in detail. In addition however, certain and changes and modifications can be made to the details of that method which will now be described.

As one modification, the scale factor which is selected for the scaled replica can be any scale factor that is desired. In each case, the number of pixels per row $P_R'$ in the scaled replica equals the number of pixels per row $P_R$ in the input image divided by the scale factor; and the number of pixels per column $P_R'$ in the scaled replica equals the number of pixels per column $P_R$ in the input image divided by the scale factor. When the scale factor is less than one, a magnified replica of the input image is generated; and when the scale factor is greater than one, a demagnified replica of the input image is generated.

As another modification, the distorted input image and the overlaid new array (such as those which are shown in FIGS. 3, 4 and 5), can be generated with the units of distance X and Y being set equal to one. This results in a simplification; and it is made possible because the terms X and Y cancel out when the area ratios in equations 1 and 3 are determined. An example of this cancellation occurs in equation 2 as was described above.

As another modification, the input image can be partitioned into sections such that each section has the same number of pixels per row $P_R$ and the same number of pixels per column $P_C$. Then, for just one partitioned section of the input image, all of the above steps which were described in conjunction with FIGS. 3 and 4 are carried out.

Since the number of pixels per row and the number of pixels per column are the same for each partitioned section of the input image, the distorted input image and overlaid new array for each partitioned section will have the same row and column spacings. Thus, the area ratios which need to be determined in equation 3 will also be the same for each section.

With the above modification, the area ratios which occur in equation 3 need only be determined for one section. Those area ratios can then be used to evaluate equation 3 for all of the remaining sections of the partitioned input image. This results in a substantial reduction in the total number of area ratios that need to be determined.

Figure 7:
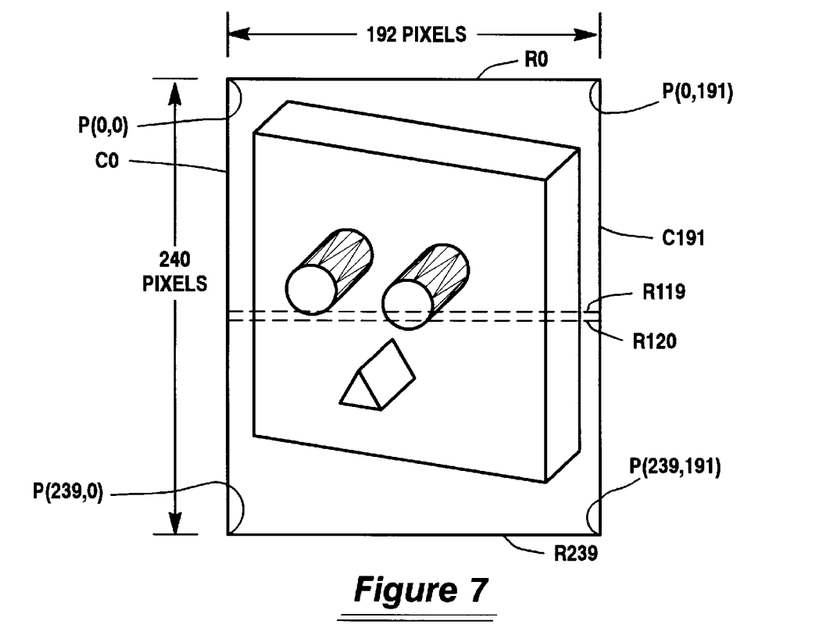
FIG. 7 shows an initial step in a modification to the process of FIGS. 1–6 wherein the input image that is to be scaled is partitioned into two symmetrical sections.

One example of this modification is shown in FIGS. 7–10. In FIG. 7, the input image is identical to the input image of FIG. 1; however, the FIG. 7 input image is partitioned into two sections which each have 192 pixels per row and 120 pixels per column. Rows R0 through R119 constitute the top section, and rows R120 through R239 constitute the bottom section.

Figure 8:
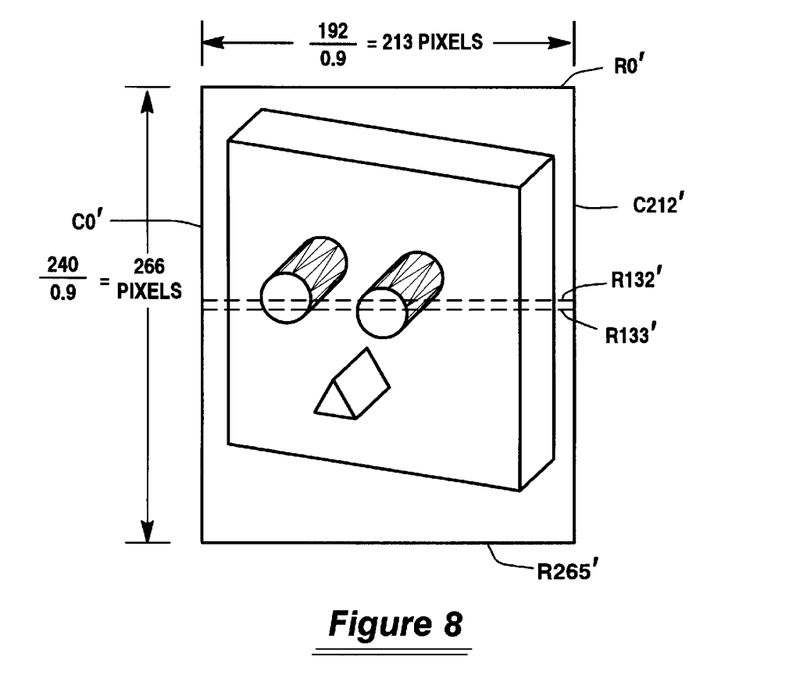
FIG. 8 shows scaled replica of the FIG. 7 input image which has two sections that correspond to the two sections in FIG. 7.

A scaled replica of the FIG. 7 input image is shown in FIG. 8; and that FIG. 8 replica is similar to the replica of FIG. 2. However, the FIG. 8 replica is partitioned into two sections which each have 213 pixels per row, and 133 pixels per column. Rows R0' through R132' constitute the top section; rows R133' through R265' constitute the bottom section.

Figure 9:
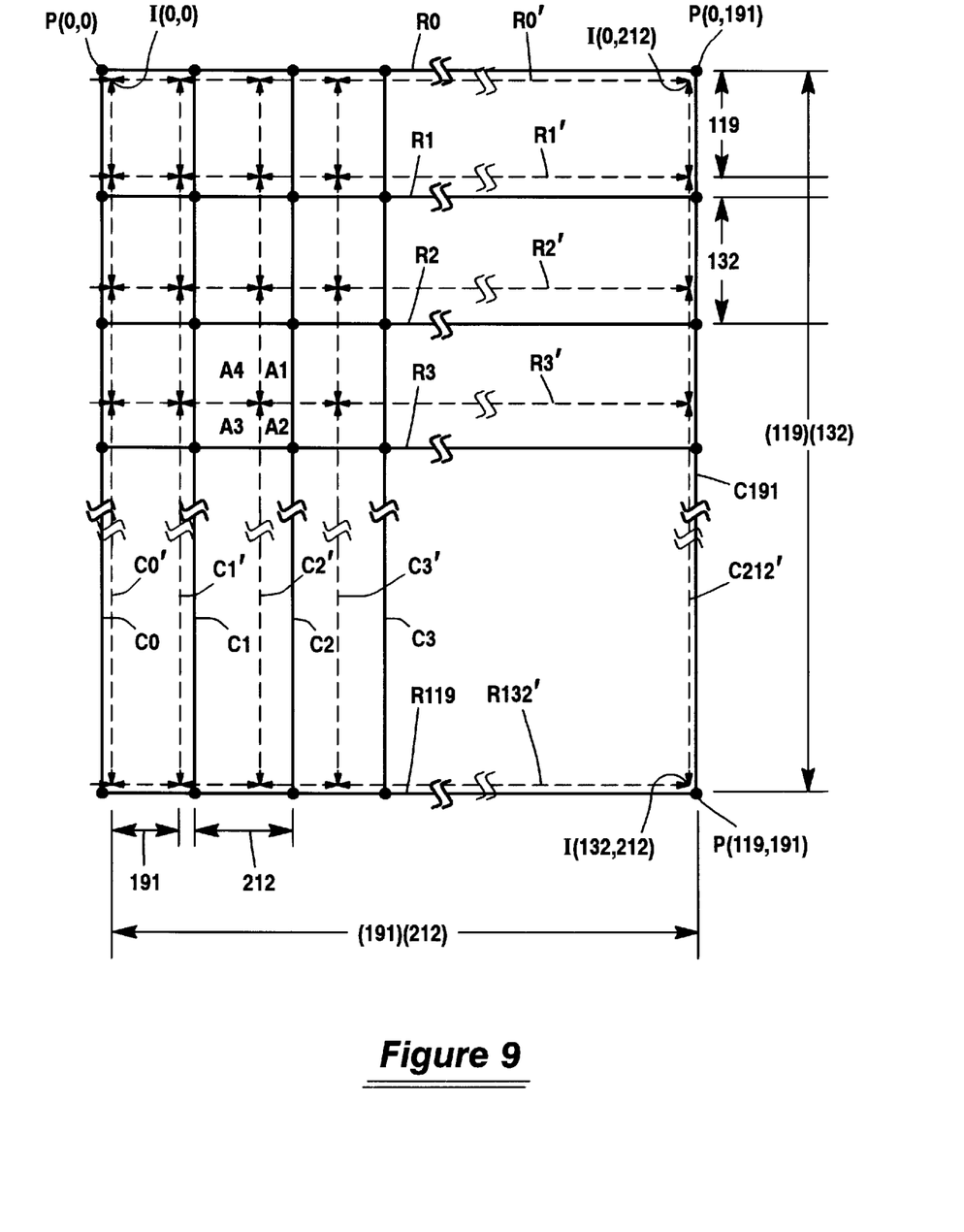
FIG. 9 shows two arrays which are generated from the top section of the FIG. 7 input image and which can be used to generate all section of the FIG. 8 scaled replica.

When the top section of the FIG. 7 input image is distorted such that the spacing between columns is $P_R'-1$ and the spacing between rows is $P_C'-1$, the result is an array which is shown by the solid lines in FIG. 9. There the rows are labeled R0, R1 . . . R119; and their spacing is $P_C'-1$ or 132. Similarly the columns are labeled C0, C1 . . . C191; and their spacing is $P_R'-1$ or 212.

Then, when the distorted top section of the input image is overlaid with a new row-column array where the spacing between columns is $P_R-1$ and the spacing between rows is $P_C-1$, the result is an array which is shown by the dashed lines in FIG. 9. There the rows are labeled R0', R1' . . . R132';

and their spacing is $P_C-1$ or 119. Similarly the columns are labeled C0', C1' . . . C212'; and their spacing is $P_R-1$ or 191.

Figure 10:
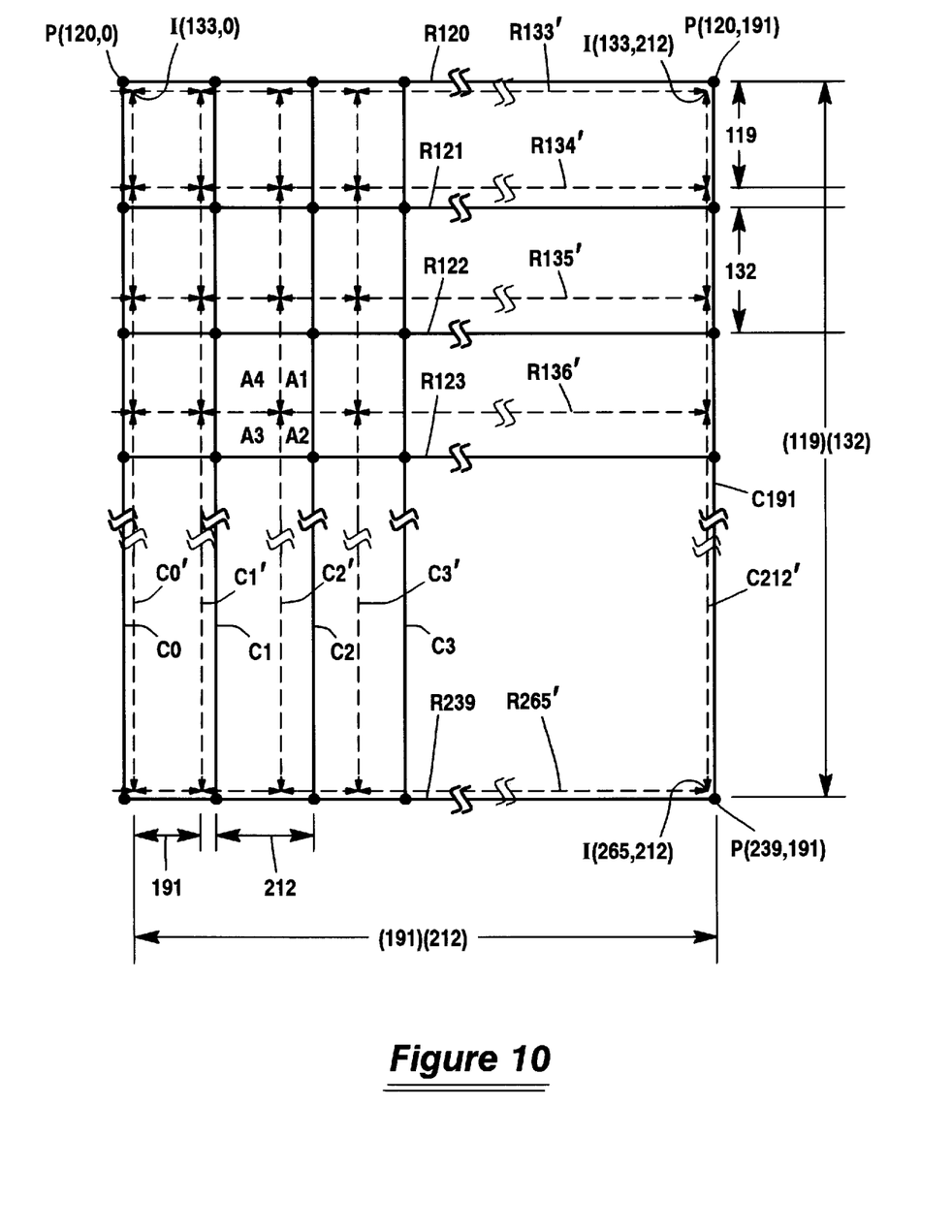
FIG. 10 shows two arrays which are generated from the bottom section of the FIG. 7 input image, and which can be used to generate all sections of the FIG. 8 scaled replica.

If the bottom section of the FIG. 7 input image is also distorted such that the spacing between columns is $P_R'-1$ and the spacing between rows is $P_C'-1$, the result is an array which is shown by the solid lines in FIG. 10. Then, if that distorted section of the input image is overlaid with a new row-column array where the spacing between columns is $P_R-1$ and the spacing between rows is $P_C-1$, the result is an array which is shown by the dashed lines in FIG. 10.

In FIG. 9, four areas A1 through A4 are shown at the intersection of row R3' with column C2'; and those areas are used in equation 3 to determine the pixel I(3,2) which occurs at the intersection of row R3' with column C2'. Similarly in FIG. 10, the same four areas A1 through A4 occur at the intersection of Row R136' with column C2'; and those areas are used in equation 3 to determine the pixel I(136,2) which lies at the intersection of Row R136' with column C2'.

Since the areas A1, A2, A3, and A4 in FIG. 9 respectively are the same as the areas A1, A2, A3, and A4 in FIG. 10, the pixels I(3,2) and I(136,2) can be determined by evaluating the areas A1, A2, A3, and A4 only one time. In more general terms, the four areas that are used by equation 3 to generate a pixel at the intersection of row R' with column C' in FIG. 9 will be the same as the four areas that are used to generate a pixel at the intersection of row R'+133 with column C' in FIG. 10.

As another modification, each partitioned section of the input image can consist of a subset of adjacent columns in the input image, rather than a subset of adjacent rows. An example of this modification is shown in FIGS. 11 and 12.

Figure 11:
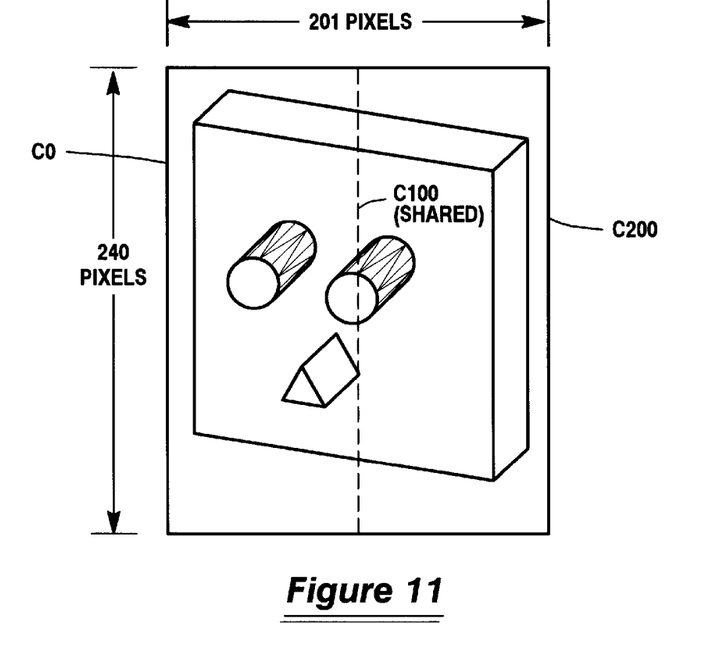
FIG. 11 shows another modification to the process of FIGS. 1–6 wherein the input image is partitioned into two symmetrical sections which share one column of pixels.
Figure 12:
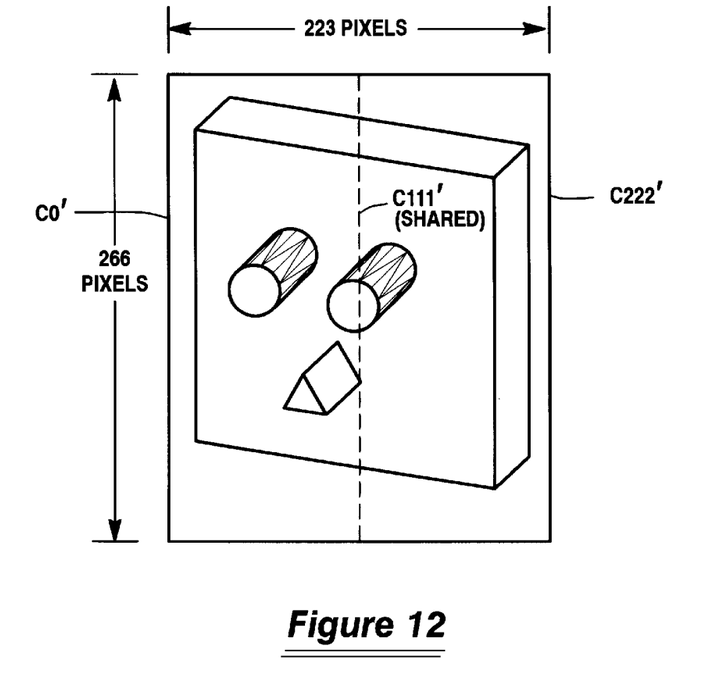
FIG. 12 shows a scaled replica for the FIG. 11 input image which has two sections that correspond to the two sections in the FIG. 11 input image.

In FIG. 11, the input image consists of an array of pixels in rows and columns which have 201 pixels per row and 240 pixels per column; and that FIG. 11 input image is partitioned into a left section and a right section. Columns C0 through C100 constitute the left section, and columns C100 through C200 constitute the right section.

This partitioning in FIG. 11 also shows that the adjacent sections of the partitioned input image can share one column of pixels. In FIG. 11, column C100 is shared. Due to this sharing, the number of pixels per row in each section is the same, even though the total number of pixels in each row of the FIG. 11 input image is an odd number.

A scaled replica of the FIG. 11 input image is shown in FIG. 12; and the scale factor for that FIG. 12 replica again is 0.9. Thus, the number of pixels per row in the FIG. 12 replica is 201÷0.9 or 223; and the number of pixels per column is 240÷0.9 or 266.

That FIG. 12 replica is partitioned into a left section and a right section. Columns C0' through C111' constitute the left section, and columns C111' and C222' constitute the right section. Column C111' is shared between the left section and the right section in order for each section to have the same number of pixels per row.

Figure 13:
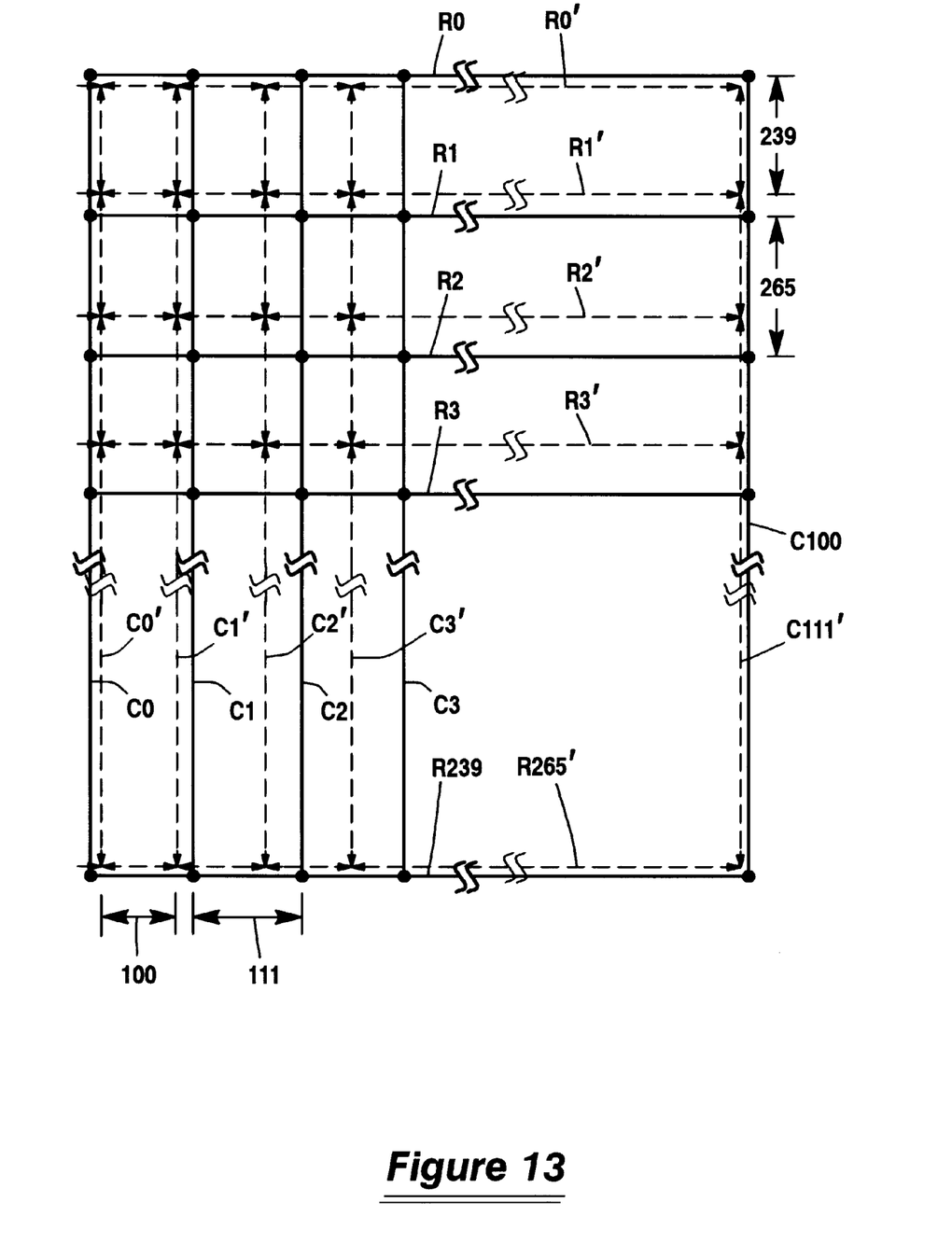
FIG. 13 shows two arrays which are generated by distorting any one of the sections in the FIG. 11 input image and overlaying that array with another new array, and which is used to generate all sections of the FIG. 12 scaled replica.

When the left section of the FIG. 11 input image is distorted such that the spacing between columns is $P_R'-1$ or 111, and the spacing between rows is $P_C'-1$ or 265, the result is the array which is shown by the solid lines in FIG. 13. There the rows which are shown by solid lines are labeled R0, R1 . . . R239; and their spacing is $P_C'-1$ or 265. Similarly, the columns which are shown by solid lines are labeled C0, C1 . . . C100; and their spacing is $P_R'-1$ or 111.

Then, when the distorted left section of the FIG. 11 input image is overlaid with a new row-column array, where the spacing between columns is $P_R-1$ and the spacing between rows is $P_C-1$, the result is another array which is shown by the dashed lines in FIG. 13. There, the rows which are shown by dashed lines are labeled R0', R1' . . . R265'; and their spacing is $P_C-1$ or 239. Similarly, the columns which are shown by dashed lines are labeled C0', C1' . . . C111; and their spacing is $P_R-1$ or 100.

If the right section of the FIG. 11 input image is also distorted such that the spacing between columns is $P_R'-1$ and the spacing between rows is $P_C'-1$, that distorted right section will have the same row-column spacing as the array which is shown by the solid lines in FIG. 13. Likewise, if the distorted right section of the input image is overlaid with a new row-column array where the spacing between columns is $P_R-1$ and the spacing between rows is $P_C-1$, that overlaid array will have the same row-column spacing as the array which is shown by the dashed lines in FIG. 17.

Since the two arrays in FIG. 13 are the same regardless of whether they are generated for the left section or the right section of the FIG. 11 input image and its scaled replica, those two arrays in FIG. 13 can be used to determine the pixels which occur in both the left section and the right section of the scaled replica. More specifically, the areas in FIG. 13 which are specified by equation 3 to generate a pixel at the intersection of row R' with column C' for the left section of the scaled replica will be the same as the areas that generate a pixel at the intersection of row R' with column C'+111 for the right section of the scaled replica.

Figure 14:
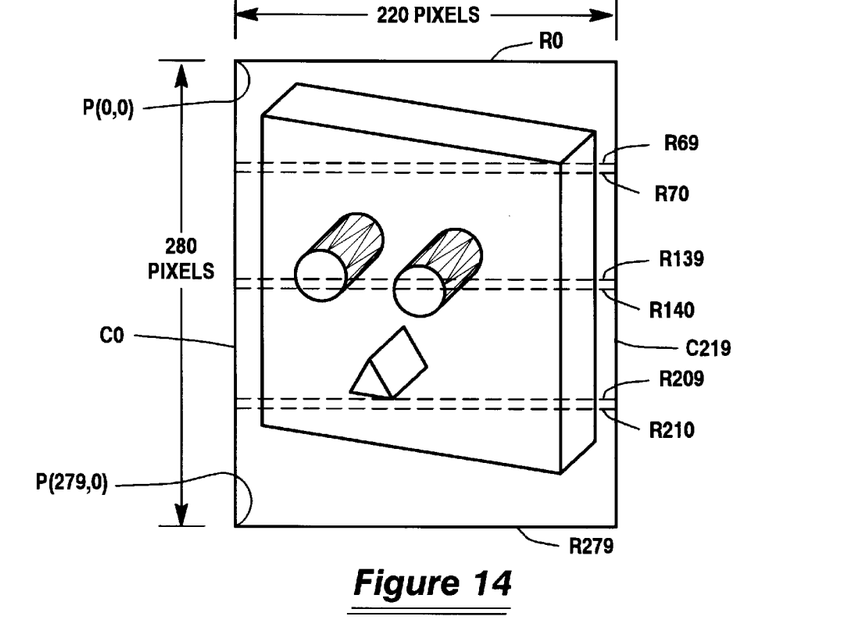
FIG. 14 shows another modification to the process of FIGS. 1–6 wherein the input image is partitioned into four symmetrical sections.
Figure 15:
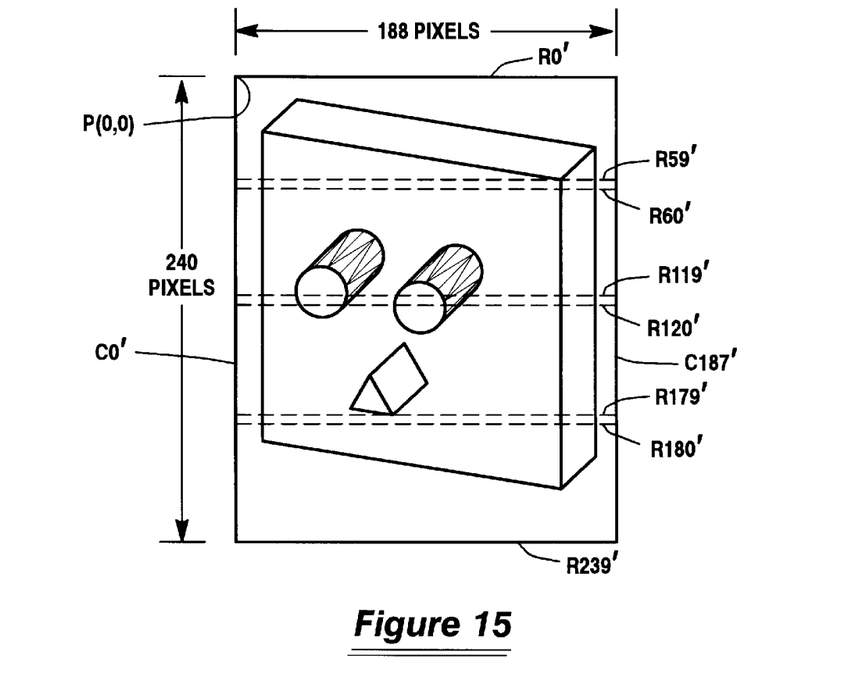
FIG. 15 shows a scaled replica of the FIG. 14 input image which is demagnified.

As another modification, the input image and its scaled replica can be partitioned into more than two sections. An example of this modification, is shown in FIGS. 14 and 15. In FIG. 14, the input image consists of an array of pixels in rows and column which have 220 pixels per row and 280 per column; and that FIG. 14 input image is partitioned into four sections. Rows R0 through R69 constitute the top section; rows R70 through R139 constitute the second section; rows R140 through R209 constitute the third section; and rows R210 through R279 constitute the bottom section.

A scaled replica of the FIG. 14 input image is shown in FIG. 15; and the scale factor for that FIG. 15 replica is 280÷240 or 1.1666. Thus in the scaled replica of FIG. 15, the input image of FIG. 14 is demagnified. In the FIG. 15 replica, the number of pixels per row is 220÷1.1666 or 188 and a number of pixels per column is 280÷1.1666 or 240.

That FIG. 15 replica is partitioned into four sections which correspond to the four sections of the FIG. 14 input image. Rows R0' through R59' constitute the top section; rows R60' through R119' constitute the second section; rows R120' through R179' constitute the third section; and rows R180' through R239' constitute the bottom section.

Figure 16:
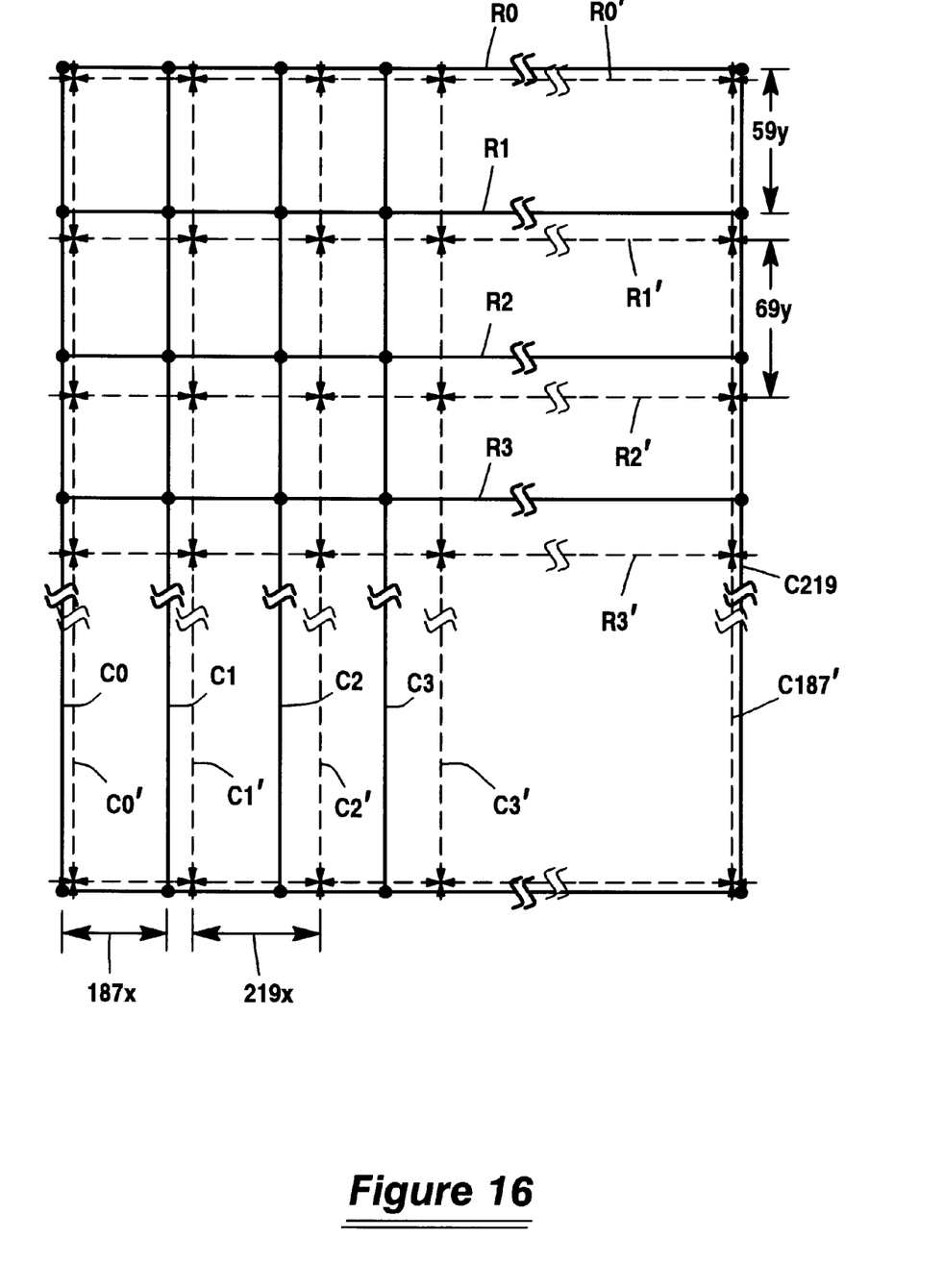
FIG. 16 shows two arrays which are generated by distorting any one of the sections of the input image in FIG. 14 and overlaying that array with another new array, and which is used to generate all sections of the FIG. 15 scaled replica.

When the top section of the FIG. 14 input image is distorted such that the spacing between the columns is $(P_R'-1)x$ or 187x and the spacing between rows is $(P_C'-1)y$ or 59y, the result is the array which is shown by the solid lines in FIG. 16. In the FIG. 16 array, the rows which are shown by solid lines are labeled R0, R1 . . . R69; and their spacing is 59y. Similarly, the columns which are shown by solid lines are labeled C0, C1 . . . C219; and their spacing 187x.

Then, when the distorted top section of the FIG. 14 input image is overlaid with a new row-column array, where the spacing between columns is $(P_R-1)x$ and the spacing between rows is $(P_C-1)y$, the result is the array which is shown by the dashed lines in FIG. 16. There, the rows which are shown by dashed lines are labeled R0', R1' . . . R59'; and their spacing is $(P_C-1)y$ or 69y. Similarly, the columns which are shown by dashed lines are labeled C0', C1' . . . C187' and their spacing is $(P_R-1)x$ or 219x.

These two arrays in FIG. 16 are the same regardless of whether they are generated for the top section or the second section or the third section or the bottom section of the FIG. 14 input image, and its corresponding scaled replica. Thus the two arrays in FIG. 16 can be used to determine the pixels which occur in each section of the scaled replica in FIG. 15. Those areas in FIG. 16 that are specified by Equation 3 to generate a pixel at the intersection of row R' with column C' for the top section of the scaled replica are the same as the areas that generate a pixel at the intersection of column C' with row R'+60, or row R'+120, or row R'+180.

Several preferred methods for generating a scaled replica of a digital input image, in accordance with the present invention, have now been described in detail. Accordingly, it is to be understood that the present invention is not limited to the details of any particular one of these methods but is defined by the appended claims.

What is claimed is:

1. A method of generating a scaled replica of a digital input image, where said input image includes an array of pixels in rows and columns; said method including the steps of:

partitioning said input image into several identical sections in which each section has $P_R$ pixels per row and $P_C$ pixels per column;

selecting the number of pixels-per-row $P_R'$ and the number of pixels-per-column $P_C'$ that are to be in each corresponding section of said scaled replica;

distorting a single section of said input image such that the spacing between columns is $(P_R'-1)x$ and the spacing between rows is $(P_C'-1)y$, where x and y are units of distance;

overlaying the single distorted section of said input image with a new row-column array where the spacing between columns is $(P_R-1)x$ and the spacing between rows is $(P_C-1)y$;

determining certain areas which are delineated by the rows and columns in the single distorted section of said input image and said overlaid new array; and, multiplying the pixels of said input image by particular ratios of said areas.

2. A method according to claim 1 wherein each section from said partitioning step consists of all of the pixels that lie in a subset of adjacent rows in said input image.

3. A method according to claim 1 wherein each section from said partitioning step consists of all of the pixels that lie in a subset of adjacent columns in said input image.

4. A method according to claim 1 wherein no section from said partitioning step shares pixels with another section from said partitioning step.

5. A method according to claim 1 wherein each section from said partitioning step shares pixels with another section from said partitioning step.

6. A method according to claim 1 wherein the total number of sections from said partitioning step is more than two.

7. A method according to claim 1 wherein said multiplying step evaluates an equation $$I(R', C') = P(UR)\left(\frac{A3}{A}\right) + P(LR)\left(\frac{A4}{A}\right) + P(LL)\left(\frac{A1}{A}\right) + P(UL)\left(\frac{A2}{A}\right)$$

where I(R',C') is a pixel in said scaled replica at the intersection of a row R' with a column C'; P(UR), P(LR), P(LL), and P(UL) are four pixels in said distorted section of said input image which are closest to the intersection of row R' and column C' in said overlaid new array; and A1, A2, A3, A4 and A are areas that are bordered by said four closest pixels in said distorted section of said input image, and by row R' and column C' in said overlaid new array.

8. A method according to claim 7 and further including the substep of using the same areas A1, A2, A3, A4, and A to generate a respective pixel in all of said sections of said scaled replica.

9. A method according to claim 1 wherein each recited step is performed by a digital computer.

10. A method according to claim 1 wherein said scaled replica is a magnified replica in which $P_R'$ is more than $P_R$, and $P_C'$ is more than $P_C$.

11. A method according to claim 1 wherein said scaled replica is a demagnified replica in which $P_R'$ is less than $P_R$, and $P_C'$ is less than $P_C$.

* * * * *